United States Patent [19]

Young

[11] 4,414,489

[45] Nov. 8, 1983

[54] COMPACT ELECTRIC DISCHARGE LAMP-AND-BALLAST UNIT, AND PLUG-IN BALLAST MODULE THEREFOR

[75] Inventor: Robert G. Young, Nutley, N.J.

[73] Assignee: North American Philips Electric Corp., New York, N.Y.

[21] Appl. No.: 318,224

[22] Filed: Nov. 4, 1981

[51] Int. Cl.³ .................. H01J 7/44; H01J 13/46; H01J 17/34; H01J 19/78; H01J 23/16; H01J 29/96; H01K 1/62

[52] U.S. Cl. .................................. 315/51; 315/56; 315/57

[58] Field of Search .............. 315/51, 56, 57, 62; 336/155; 362/410, 412, 413, 414, 417

[56] References Cited

U.S. PATENT DOCUMENTS

| | | | |
|---|---|---|---|
| 3,551,736 | 12/1970 | Doehner | 315/100 |
| 3,815,080 | 6/1974 | Summa | 339/52 R |
| 3,953,761 | 4/1976 | Giudice | 315/71 |
| 4,173,730 | 11/1979 | Young et al. | 315/53 |
| 4,318,160 | 3/1982 | Dooley et al. | 362/410 |

FOREIGN PATENT DOCUMENTS

4928293 9/1976 Japan .
4928295 12/1977 Japan .

Primary Examiner—Alfred E. Smith
Assistant Examiner—Robert E. Wise

[57] ABSTRACT

A single-ended compact fluorescent lamp having an envelope that is partitioned or of multi-U-bent shape and defines a tortuous arc path is combined with a plug-in ballast module which is elongated in a lateral direction but has a low profile and a narrow width. The resulting decrease in the overall height dimension of the unit formed by the mated lamp and module, together with the narrow width of the module, permit the unit to fit within the harp component of a table lamp or similar lighting fixture and be used as a replacement for an incandescent lamp. The screw-in socket of the lamp fixture is provided with a threaded adapter plug which enables the lamp-ballast unit to be plugged into the adapter after it has been inserted between the spaced support rods of the harp component. Alternatively, the threaded plug is made a part of the module and constitutes an integral threaded base member which permits the lamp-ballast unit to be screwed directly into the fixture socket after the harp component has been temporarily removed.

20 Claims, 14 Drawing Figures

COMPACT ELECTRIC DISCHARGE LAMP-AND-BALLAST UNIT, AND PLUG-IN BALLAST MODULE THEREFOR

BACKGROUND OF THE INVENTION

This invention generally relates to the electric lamp art and has particular reference to a low-pressure discharge lamp and ballast unit that is adapted for use as a replacement for an incandescent-type lamp bulb in various kinds of lighting fixtures such as table lamps and the like.

Compact fluorescent lamps having plug-in type ballast and adapter components which provide a lamp assembly that can be used as a substitute for an incandescent lamp in the screw sockets of conventional lighting fixtures are generally well known in the art. A fluorescent lamp assembly having these features is disclosed in U.S. Pat. No. 3,551,736 issued Dec. 29, 1970 to Doehner. As shown in FIGS. 1, 2, 4 and 6 of this patent, the plug-in ballast component contains a single iron-core inductive ballast that is of annular shape and is housed in a cylindrical module that matches the contour of the tubular fluorescent lamp. Another screw-in type fluorescent lamp assembly which is designed for use in fixtures intended for incandescent lamp bulbs is disclosed in U.S. Pat. No. 3,953,761 issued Apr. 27, 1976 to Giudice. In accordance with this patent the fluorescent lamp is of such construction that it defines a central cavity or chamber which receives an axially-elongated inductive ballast component. In U.S. Pat. No. 3,815,080 (issued June 4, 1974 to Summa) a conventional double-ended fluorescent lamp is coupled to a threaded base member by plug-in adapters to provide an elongated screw-in type lamp assembly.

Compact fluorescent lamp units which comprise a partitioned fluorescent lamp of single-ended construction having pin contacts that are plugged into a ballast module which also contains a DC-operating circuit means and has a threaded base member which permits the lamp unit to be used in screw type sockets are also known and are disclosed in U.S. Pat. No. 4,173,730 issued Nov. 6, 1979 to Young et al. Fluorescent luminaires having lamp components of triple-U-bent or "double-fold" configuration that are mounted on cylindrical-shaped modules which contain a ballast component and have blade-like or screw type connectors are disclosed in Japanese Design Patents No. 437,859 of Takeda et al. granted on applications Showa No. 49-28293 and Showa No. 49-28295 filed Aug. 16, 1974.

While the prior art screw-in fluorescent lamp units were satisfactory from the standpoint of providing an energy-efficient substitute for incandescent lamps, the construction and size of the ballast module placed dimensional constraints on the fluorescent lamp component which reduced its size and thus its light output. The stringent size limitations on the lamp component derived from the fact that the lamp unit had to be small enough to fit within the harp components that are conventionally used in table-lamp fixtures and the like to hold the lamp shades in place. Since the light output of a fluorescent lamp is principally determined by the length of its arc path (and hence the physical dimensions of the lamp envelope), it was very difficult in the prior art to provide a fluorescent lamp-ballast unit that was not only compact enough to fit into table-lamp fixtures and the like but would also generate enough light to match the illumination level of the incandescent lamps normally used in such fixtures.

SUMMARY OF THE INVENTION

The foregoing problems and other disadvantages are solved in accordance with the present invention by providing a ballast module of such unique configuration and construction that it drastically reduces the profile or thickness dimension of the module in the critical lamp-coupling region and thus permits single-ended fluorescent lamps of larger physical size and increased light output to be used in the screw sockets of table-lamp fixtures and the like. In accordance with a preferred embodiment, this is achieved by elongating the ballast module in a lateral direction so that it has two offset overhanging segments that are joined by a medial segment which is provided with suitable plug-in contactor elements that are oriented to mate with and engage terminals on the end of the fluorescent lamp. The medial segment of the laterally-elongated module member is of reduced width and thickness and thus serves as a low-profile electrical-coupling means that will not only fit between the upstanding support rods of the harp component of the lamp fixture but also reduces the overall height of the assembled lamp-module unit. The offset segments of the module extend beyond the sides of the lamp and contain a pair of inductive ballast components that are connected to the plug-in contacts of the module. These offset segments accordingly also extend beyond and overhang the harp component of the table-lamp fixture when the lamp-ballast unit is placed in the fixture socket.

In order to permit the lamp-ballast unit to be electrically coupled to the screw socket of the lamp fixture without rotating the unit, an adapter plug having a threaded body portion is placed in the fixture socket and suitable contact elements are provided on the bottom face of the medial segment of the module so that the latter can be plugged into the adapter. The lamp-ballast unit is thus simply slipped sideways into the opening of the harp component of the lamp fixture by properly orienting the elongated module relative to the support rods of the harp. After the unit is properly aligned with the plug adapter in the fixture socket, the lamp-ballast unit is pushed toward and inserted into the plug adapter. The fact that the length of the ballast module is greater than the width of the harp opening and thus prevents the lamp-ballast unit from being rotated when it is in position within the harp component does not constitute a problem since electrical coupling of the unit with the fixture socket is achieved without any rotational movement of the unit. In an alternative embodiment, the screw-in adapter constitutes an integral part of the ballast module and the lamp-ballast unit is screwed into the fixture socket after the harp component has been temporarily removed.

Thus, in accordance with the novel concepts of the present invention the overall height of a fluorescent lamp-ballast module unit is greatly reduced by constructing the module in such a fashion that the ballast components are located in laterally-offset overhanging portions of the module and are electrically connected to each other and to the lamp and socket terminals by a medial coupling portion of the module that has a low thickness "profile" and is small enough to fit within the harp component of the lighting fixture.

BRIEF DESCRIPTION OF THE DRAWING

A better understanding of the invention will be obtained from the exemplary embodiments shown in the accompanying drawings, wherein.

DESCRIPTION OF THE PREFERRED EMBODIMENTS

While the compact fluorescent lamp-ballast unit of the present invention can be employed in various kinds of lighting fixtures as a replacement for screw-type incandescent lamps, it is especially adapted for use in conjunction with table lamps and similar fixtures used in homes and offices and, accordingly, has been so illustrated and will be so described.

Figure 1:
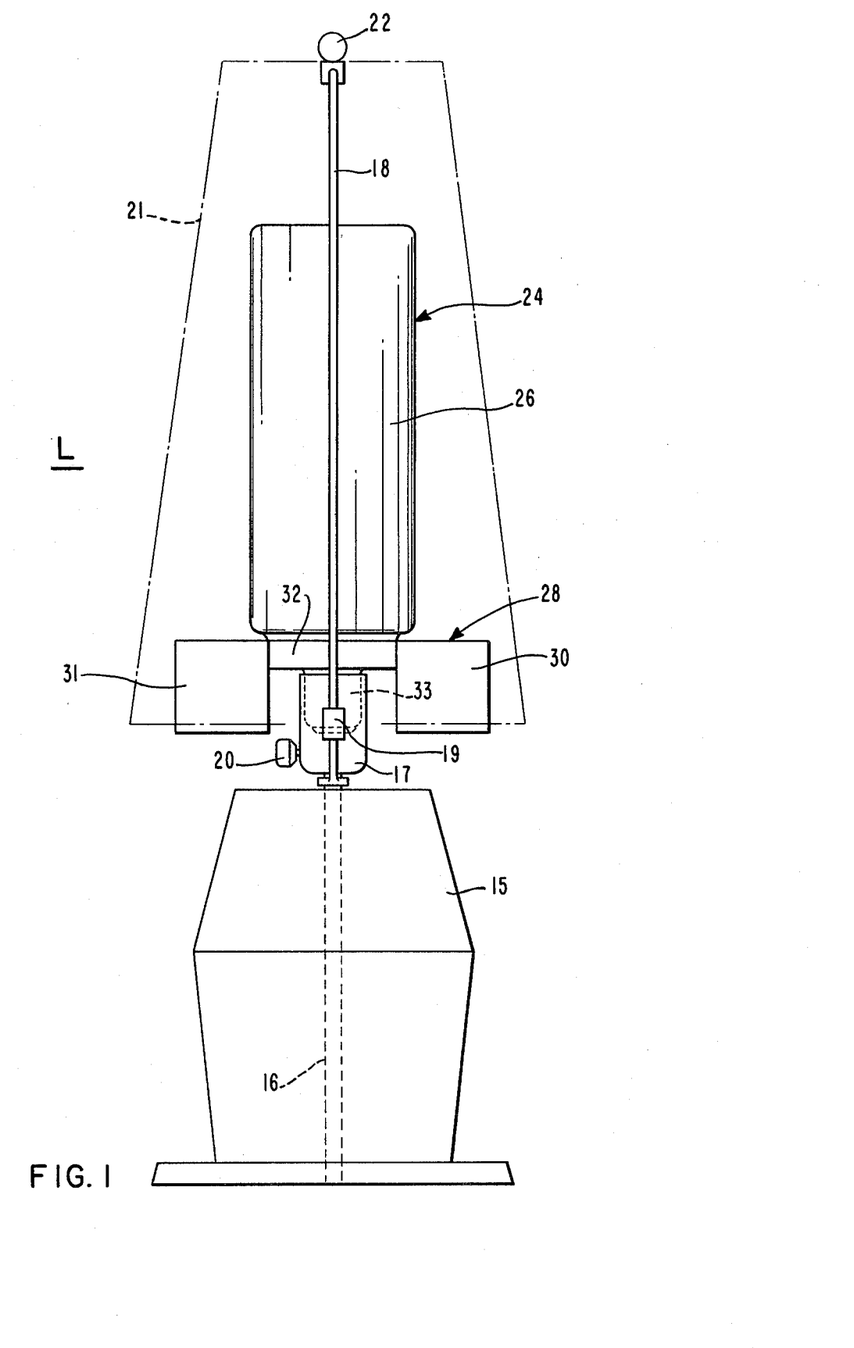
FIGS. 1 and 2 are front and side elevational views, respectively, of a table-lamp fixture having the improved lamp-ballast unit of the present invention mounted in the screw-in socket of the fixture and disposed within the harp component.
Figure 2:
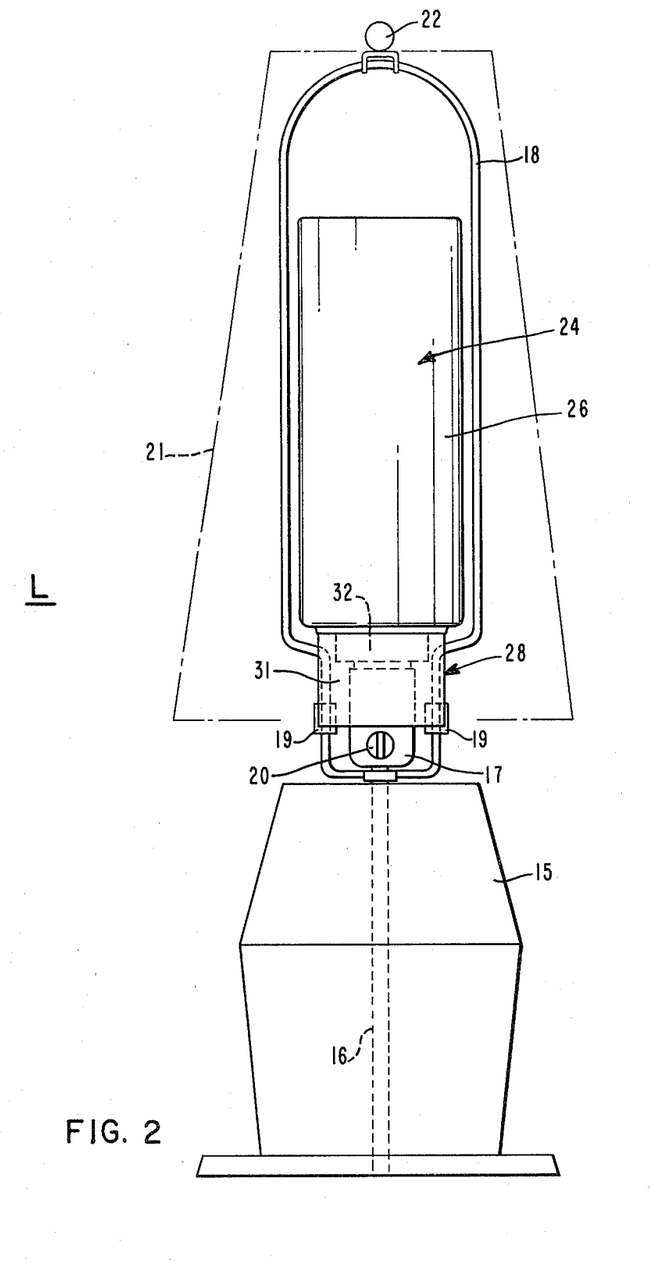

A conventional table lamp L representative of such lighting fixtures is shown in FIGS. 1 and 2 with the improved discharge lamp-ballast unit of the present invention seated in the fixture socket in place of the incandescent lamp bulb which would normally be used. As will be noted, the table lamp L consists of the usual pedestal or base 15 having a support member 16 which holds a screw-type socket 17 in place along with an upstanding harp component 18 that defines an opening of predetermined height and width, which dimensions are more or less standard in the fixture industry. Table lamps typically have a harp component which is 12 inches (30.48 cm) long and defines an opening that actually measures about 9¼ inches (22.5 cm) in height and about 5 inches (12.7 cm) wide—the width dimension narrowing down to about 2 inches (5.1 cm) in width at a location adjacent the fixture socket 17. These are, accordingly, the critical dimensional parameters which a retrofit discharge lamp-ballast unit must meet in order to be practical. The harp component 18 is fastened to the support yoke assembly of the lamp fixture L in the usual manner by a pair of slip-fitting metal sleeves 19 and a suitable lamp shade 21 is secured to the top of the harp component 18 by a threaded knob 22 or finial.

In accordance with the present invention, the lighting fixture L is provided with a compact highly efficient light source consisting of a single-ended fluorescent lamp 24 that has a cylindrically shaped envelope 26 and is mechanically and electrically coupled to a ballast module 28 to form a unitary assembly. As will be noted particularly in FIG. 1, the ballast module 28 is elongated in a lateral direction and comprises a pair of offset segments 30, 31 that are joined by a medial segment 32 which is much thinner and is seated against the sealed end of the lamp envelope 26. The offset segments 30, 31 laterally extend beyond the sides of the fluorescent lamp 24 and the harp component 18 and thus constitute overhanging portions of the module 28 that are disposed on opposite sides of the lamp socket 17 and the axis of the lamp-module unit. The medial segment 32 of the ballast module 28 is also of smaller width than the offset segments 30, 31 so that the lamp-module unit easily fits within the narrow opening defined by the necked-in portion of the harp 18 adjacent the socket 17. As hereinafter disclosed in detail, the medial segment 32 is provided with plug-in type contact elements on its upper and lower faces which permit the fluorescent lamp 24 and ballast module 28 to be plugged into one another and then into a threaded adapter plug 33 (shown in phantom in FIGS. 1 and 2) which has previously been screwed into the socket 17 of the lamp fixture L.

As will be noted in FIG. 1, the overhanging segments 30, 31 of the ballast module 28 are of generally rectangular shape and symmetrically arranged in offset relationship with respect to the lamp axis so that they counterbalance one another. They are also of such size and shape that they do not interfere with the operation of the fixture switch 20 which protrudes from the bottom of socket 17.

As will be noted in FIG. 2, the axially-offset overhanging segments 30, 31 of the ballast module 28 are wider than the constricted opening at the necked-end portion of the harp component 18 so that the ballast module 28 would not fit into the harp-socket assembly of the lamp fixture L were it not for the low profile and narrow width dimension of the medial segment 32 of the module.

Figure 3:
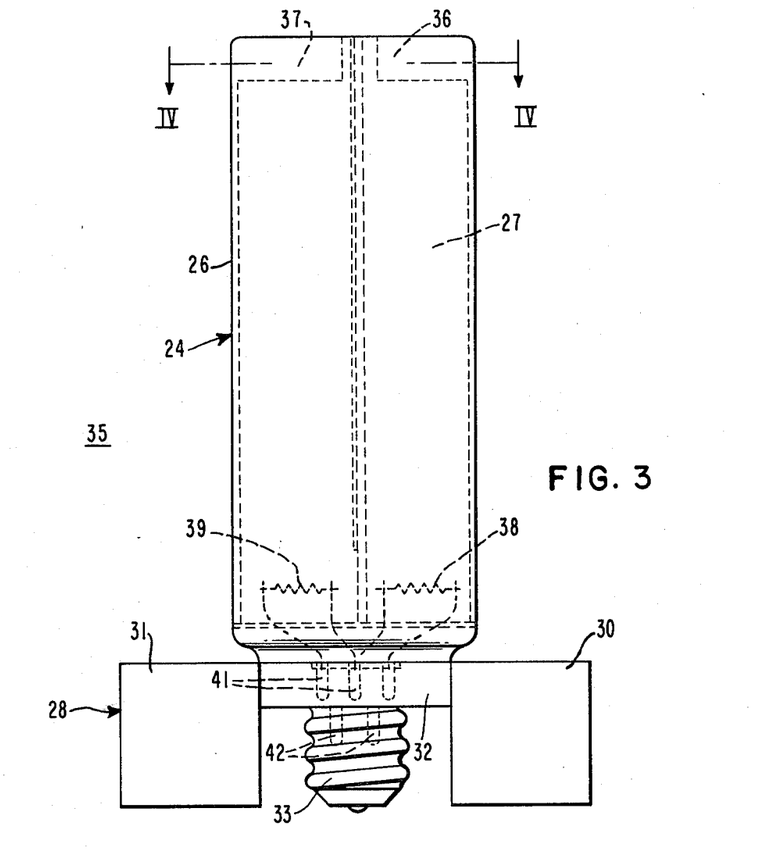
FIG. 3 is an enlarged side elevational view of the fluorescent lamp-ballast unit and the plug adapter shown in the FIGS. 1–2.
Figure 4:
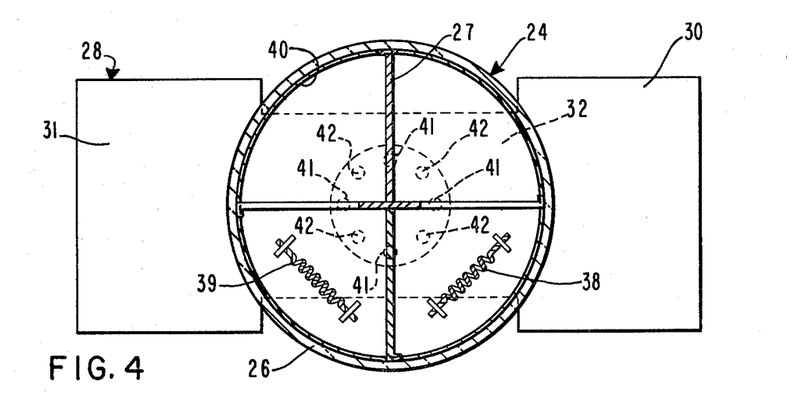
FIG. 4 is a cross-sectional view of the lamp-ballast unit, along line IV—IV of FIG. 3.
Figure 5:
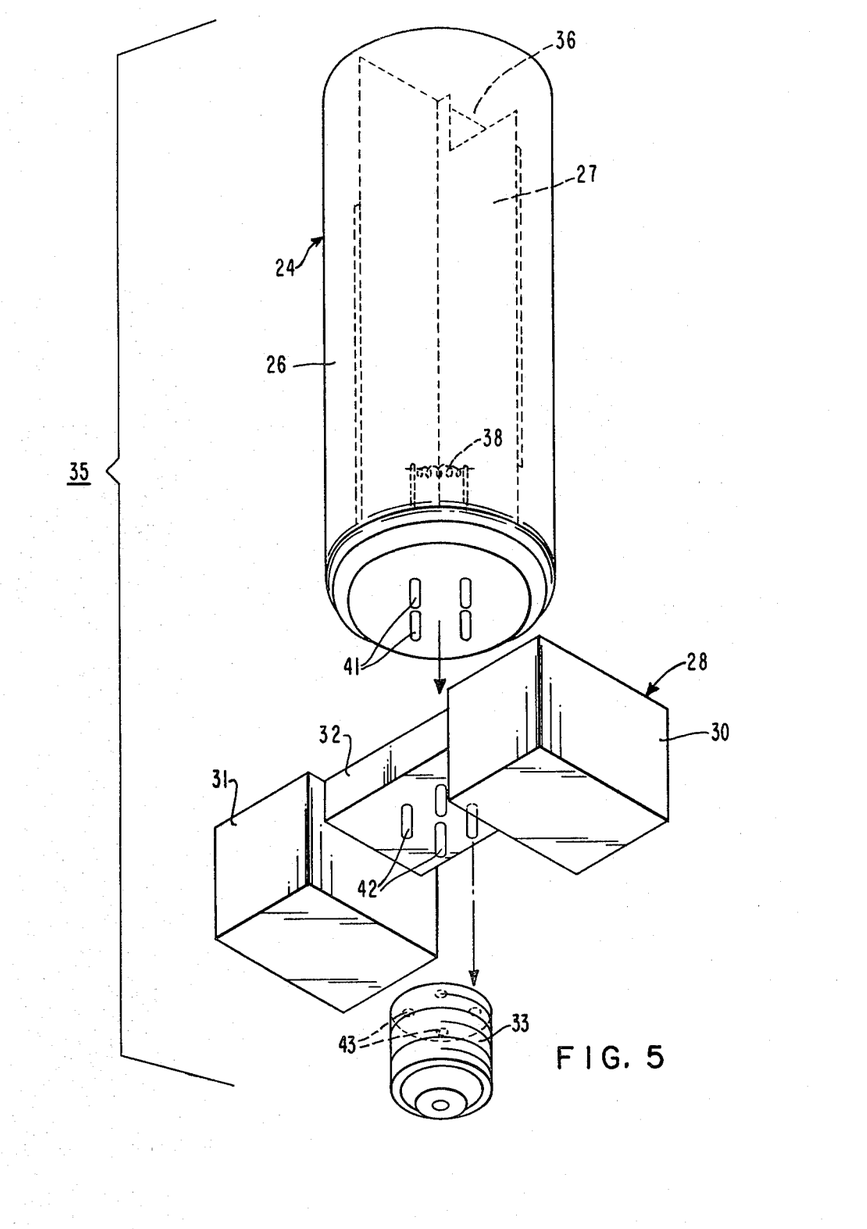
FIG. 5 is an isometric exploded view of the fluorescent lamp, ballast module and adapter components illustrating the manner in which they plug into one another to form the assembled unit shown in FIGS. 1–4.

The unitary assembly 35 which is formed by the various plug-in components of the present invention and constitutes the power-conserving replacement for screw-in type incandescent lamps in general lighting fixtures is shown in detail in FIGS. 3–5 and will be now described. As particularly illustrated in FIGS. 3 and 4, the fluorescent lamp 24 contains a partition assembly 27 that nests within the cylindrical envelope 26 and has three apertures or cutouts 36, 37 (and another one which is located at its basal end and is thus hidden from view). These cutouts provide a retroverted arc path that extends from one of the thermionic electrodes 38 located at the sealed end of the envelope 26 to the other thermionic electrode 39 that is located at the same end of the lamp but on the opposite side of the non-apertured isolating panel of the partition assembly 27. The arc discharge thus follows a tortuous and elongated path as it traverses the partition assembly 27, thereby "passing" through the envelope 26 four times and increasing the light output generated by the lamp 24. Such partitioned fluorescent lamps are well known in the art and, in addition to thermionic electrodes and a partition structure, also contain the customary starting gas (such as several Torr of argon or the like) and a small dose of mercury which provide the required ionizable medium and produce the ultraviolet radiations which excite the phosphor coating 40 (shown in FIG. 4) that is deposited on the inner surface of the envelope 26.

Figure 14:
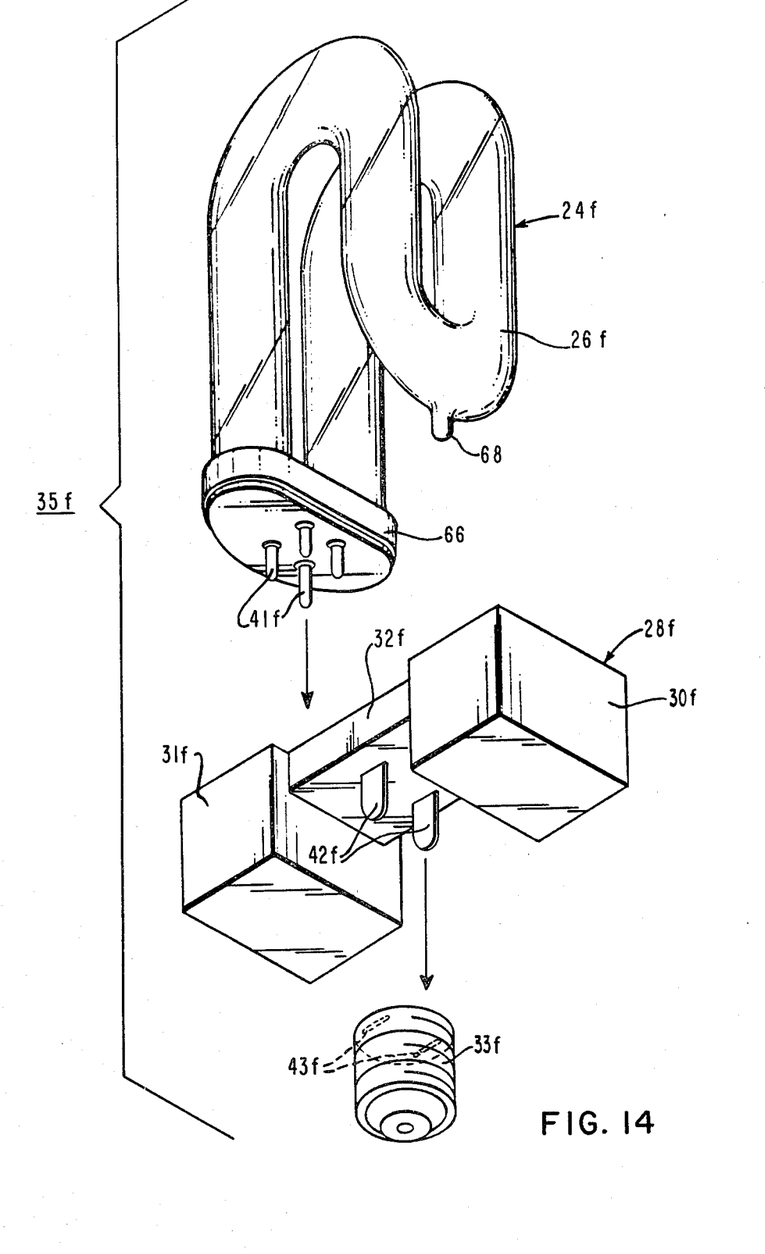
FIG. 14 is an isometric exploded view of another plug-in lamp-module unit which employs a triple-U-bent type fluorescent lamp as the lamp component.

While a "four-pass" partition type compact fluorescent lamp 24 is employed in this embodiment, it will be understood to those skilled in the art that the invention is not limited to this particular kind of single-ended discharge lamp but can be used with other types of low-pressure discharge lamps which contain a different ionizable medium (sodium instead of mercury, for example) and have envelopes that are partitioned in a different manner or which have a tubular envelope that is bent into various shapes to form the required compact size (helical configuration, triple-U-bent form, etc.). A lamp-module unit 35f which has a triple-U-bent fluorescent lamp component is illustrated in FIG. 14 and hereinafter described.

As shown in FIG. 3, the lamp electrodes 38, 39 are connected by lead wires to four terminal pins 41 that plug into and engage a corresponding number of sleeve-like contacts provided in the upper portion or top face of the medial segment 32 of the ballast module 28. This plug-in juncture electrically connects the electrodes 38, 39 with the ballast components located in the offset segments 30, 31 of the module. Electrical coupling with the threaded adapter plug 33 is effected by a second set of four terminal pins 42 that are provided on the lower or bottom face of the module segment 32 and electrically mate in plug-in fashion with a corresponding number of slip-fitting contact elements provided in the adjacent seated portion of the adapter plug. This second plug-in juncture electrically connects the ballast module 28 with the threaded metal shell and end contact of the adapter plug 33 which, in turn, engage the socket contacts of the lamp fixture L.

As will be noted in FIG. 4, the two sets of terminal pins 41 and 42 are suitably radially spaced from one another to avoid mechanically weakening the thin medial segment 32 of the ballast module 28 and avoid wiring problems etc. which could complicate module manufacture. Since electrical connection of the adapter plug 33 with the ballast components in the module 28 only requires a single pair of terminals, two of the pins 42 on the bottom of the module are "dummy" pins and can be eliminated if desired (along with the associated slip-connectors in the plug).

The manner in which the fluorescent lamp 24, ballast module 28, and adapter component 33 plug into one another to form the complete assembly or unit 35 is shown in FIG. 5. The four contact elements in the threaded adapter member 33 which receive the four terminal pins 42 of the module 28 are shown in phantom and are identified by the reference numeral 43. As will be noted, the plug-in pin terminals 42 and slip-fitting sleeve-like contacts (not shown) on the opposite faces of the medial segment 32 of the module 28 are both engageable in a direction and along a path which is transverse to the longitudinal axis of the module and in line with the lamp axis. As will also be noted in this Figure (and more particularly in FIG. 3), the reduced thickness of the medial segment 32 of the ballast module 28 forms a central recess or cavity which accommodates the adapter plug 33 and permits a telescoped interfitting of the three components which greatly reduces the overall height of the lamp-ballast-adapter unit 35.

Figure 6:
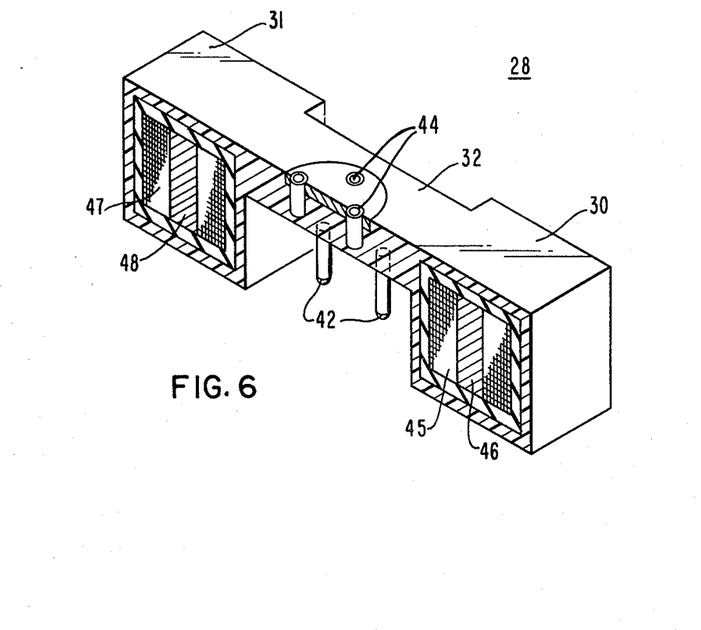
FIG. 6 is a sectionalized isometric view of the ballast module shown in the preceding figures.

A cut-away view of the ballast module 28 is shown in FIG. 6. As illustrated, the prong or pin contacts 42 which engage the plug adapter 33 protrude from the lower face of the constricted medial segment 32 of the module 28 and a set of four slip-fitting receptacle contacts 44 are mounted flush with the top face of segment 32 so that they provide a plug-in socket for the lamp terminals 41. The pin contacts 42 and slip-fitting contacts 44 are both centered with respect to the transverse axis of the module 28 and are thus also centered with respect to the longitudinal axis of the fluorescent lamp 24 (when the components are mated). Offset segment 30 contains an inductive ballast component consisting of the usual insulated wire winding 45 and iron core 46. The other offset segment 31 contains another inductive ballast which also consists of a wire winding 47 and iron core member 48. Each of the ballast components are connected to each other and to the module contacts 42 and 44 by suitable wiring (not shown) in the module 28 so that they are in series with the fluorescent lamp 24 when the lamp and module are in coupled and mated relationship. The ballast module 28 can be fabricated from a suitable durable plastic or the like which provides adequate insulation for the various contact members or it can be made from sheet metal having suitable insulating inserts, etc. for the contacts and ballast circuit components.

If desired, a suitable switch can be provided on module 28 and connected to the two inductive ballast components and contacts 42 and 44 in such a way that the lamp 24 is operated with only one ballast component or with the two ballast components connected together, thereby producing two different levels of light output and illumination. Also, a conventional lamp-starting component (such as a well-known glow-switch element) can be included as an integral part of the ballast module 28 and connected to the ballast components and various contacts in the proper relationship by suitable wiring.

As a specific example, a ballast module 28 of the type shown in FIG. 6 containing a pair of conventional 20-watt inductive ballasts housed in the offset segments 30 and 31 had a length of around 135 mm, an overall height (the thickness of the offset segments) of only 40 mm, a width of approximately 53 mm, and provided a central recess or cavity 27 mm deep so that the thickness dimension of the medial segment 32 was around 13 mm. The width of the medial segment 32 was approximately 40 mm. When the module was coupled in seated relationship with a "four-pass" partitioned fluorescent lamp that had a length dimension (excluding the terminal pins) of $5\frac{3}{4}$ inches (14.6 cm) and a diameter of $2\frac{1}{8}$ inches (5.4 cm.) the resulting lamp-module unit had an overall height dimension of approximately $6\frac{1}{4}$ inches (15.9 cm.) along the critical portion of the unit—that is, from the outer face of the thin medial segment of the module to the flat top of the cylindrical envelope of the lamp. The lamp-module unit was thus small enough to fit within the harp component of the table lamp fixture L with considerable clearance in all dimensions.

Since the inductive ballasts are located the same distance off the axis of the module 28 (and thus off the lamp axis also), they counterbalance one another despite their relatively large mass and thus retain the center of gravity of the lamp-ballast unit 35 on the lamp axis when the two components are coupled together and placed into the lamp fixture. The assembled unit is thus quite stable from a weight standpoint and does not place undue stress on the fixture socket or associated support hardware of the table lamp L.

Figure 7:
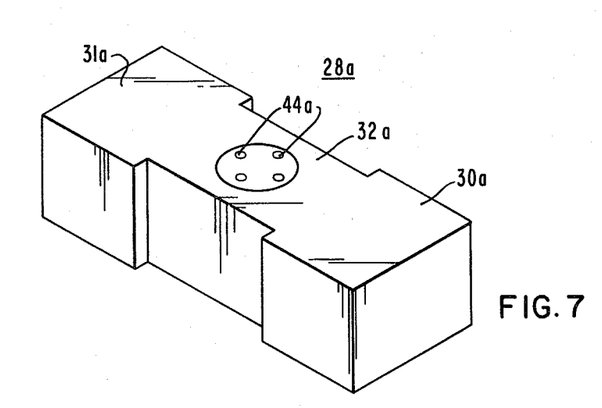
FIGS. 7–10 are pictorial views of alternative ballast module embodiments having different configurations.
Figure 8:
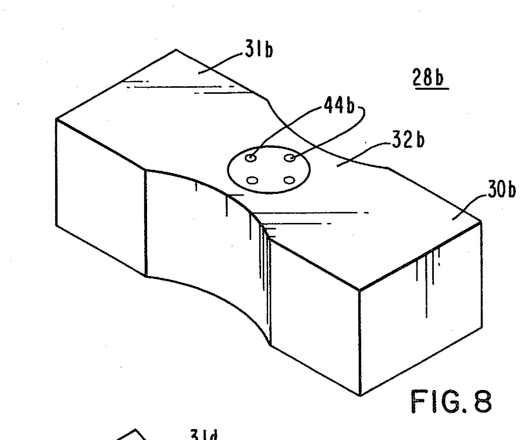

The improved ballast module of the present invention is not limited to the precise shape shown in the FIGS. 1–6 embodiment. As illustrated in FIG. 7, an alternate ballast module 28a would have the same basic shape and size as the previously described module 28 except that the metal segment 32a would not be undercut and would thus be of the same thickness as the offset segments 30a and 31a. In module 28b (shown in FIG. 8) the desired narrow width dimension of the medial segment 32b is obtained by providing this portion of the module with inwardly curved sides rather than slot-indents as in the FIG. 7 embodiment.

Figure 9:
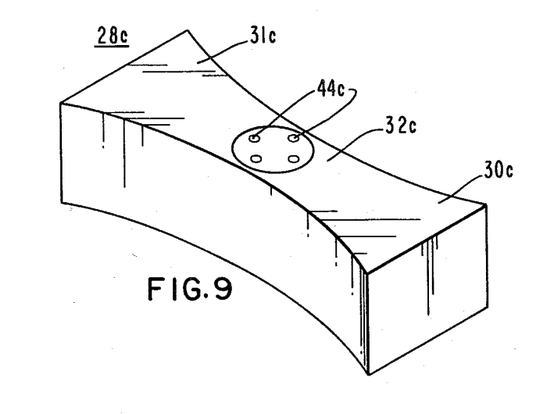
Figure 10:
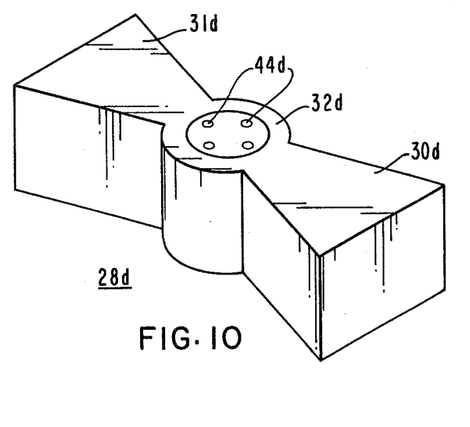

The curved side concept is employed to an even greater degree in the module embodiment 28c shown in FIG. 9. As illustrated, both sides of the module are flared inwardly along the entire length of the module so that the narrow medial segment 32c merges smoothly with the offset segments 30c and 31c. In the embodiment shown in FIG. 10, the module 28d has angularly-tapered offset segments 30d and 31d which are joined by a cylindrical-shaped medial segment 32d whose width dimension is smaller than the width of the enlarged end faces of the tapered offset segments.

While not shown, the medial segments of each of the alternative module embodiments shown in FIGS. 7–10 include a plurality of downwardly protruding contacts or pins which permit the modules to be plugged into the threaded adapter and thus be connected to the screw-in socket of the lighting fixture. In order to achieve a telescoped interfitting of the mated components, each of the alternative module embodiments can also be provided with a cavity or recess on their lower face which would contain the contact pins and be large enough to accommodate the upper portion of the fixture socket. Such pins would be aligned with the slip-fit contacts 44a, 44b, 44c and 44d provided on the top faces of the respective medial segments of the alternative module embodiments.

Figure 11:
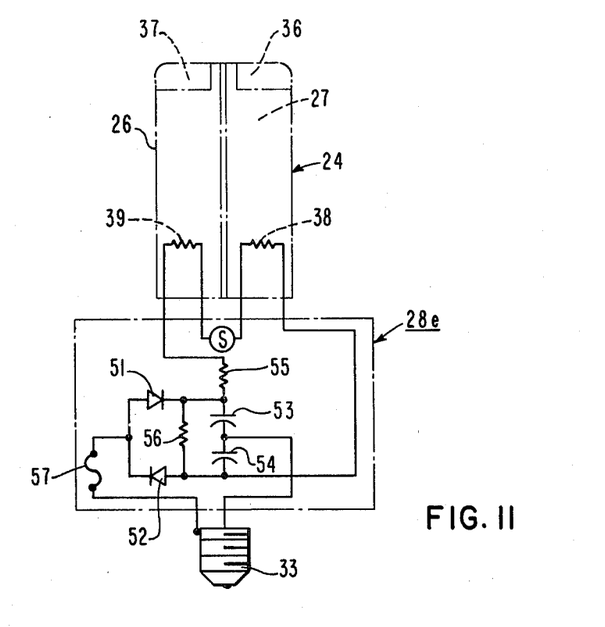
FIG. 11 is a schematic representation of an alternative lamp-ballast-adapter assembly wherein the ballast module also contains a miniaturized electronic circuit for operating the fluorescent lamp on DC power from an AC power source.

The invention is also not limited to inductive-type ballast modules but includes within its scope modules that contain a resistor-type ballast component and solid-state circuitry which would permit the compact fluorescent lamp to be operated in a DC mode from an AC power supply. A lamp-ballast-adapter assembly 50 which has these features is shown in FIG. 11. As will be noted, the "four-pass" partition fluorescent lamp 24 and threaded adapter 33 are identical to those used in the FIGS. 1–6 embodiment so that the lamp has a cylindrical-shaped envelope 26 that contains a pair of electrodes 38, 39 and a partition assembly 27 that has apertures 36 and 37 which provide a retroverted arc path.

In accordance with this embodiment, the ballast module 28e contains a solid-state voltage-doubling circuit that consists of a pair of diodes 51, 52 that are connected by suitable conductors to a pair of capacitors 53, 54 in such a manner that during one-half cycle of AC input voltage diode 51 conducts and charges capacitor 53 to full-peak voltage, and on the other half cycle of AC input diode 52 conducts and charges the other capacitor 54 to full-peak voltage. Since the capacitors 53, 54 are in series, the resulting open circuit DC voltage across both capacitors is about 2.7 times the input rms voltage and, in case of a 120-volt, 60-Hertz, AC power supply, produces approximately 324 volts DC. The DC output is applied to the lamp 24 by connecting capacitor 53 to one side of electrode 39 through a ballast resistor 55, and capacitor 54 directly to one side of the other lamp electrode 38. A suitable starting component S is connected to the other ends of the lamp electrodes to supply preheat current in the well-known manner. Suitable conductors connect the shell and end contacts of the threaded adapter 33 with the diode and capacitor networks, respectively, to complete the circuit in the manner illustrated in FIG. 11.

A resistor 56 can be connected in parallel with capacitors 53, 54 to ensure that they are quickly and completely discharged when the power supply is switched off. As an additional safeguard, a fuse 57 (or other automatic protective means) is connected in series with the diode-capacitor network to sense current overloads and open the circuit before any damage occurs. A solid-state doubling circuit of this type is described in detail in the aforementioned U.S. Pat. No. 4,173,730 (Robert G. Young et al.) and the teachings of this patent with respect to such circuit (as well as the structural details of the partitioned fluorescent lamp) are incorporated herein by reference. As indicated in the aforesaid patent, the ballast resistor 55 would have a value of approximately 75 ohms and preferably would be of the wire-wound type and have a 10-watt rating.

Figure 12:
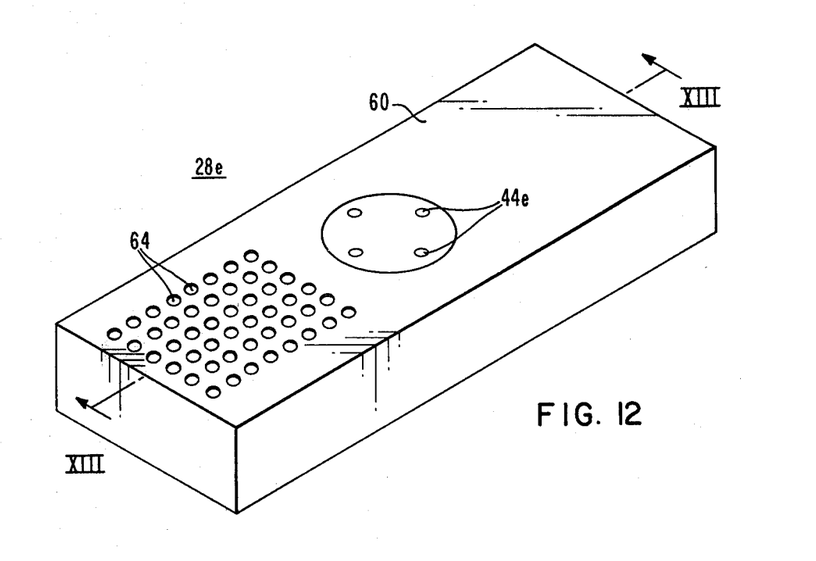
FIG. 12 is an enlarged pictorial view of the elongated ballast module which contains the ballast resistor and other solid-state circuit components employed in the FIG. 11 embodiment.
Figure 13:
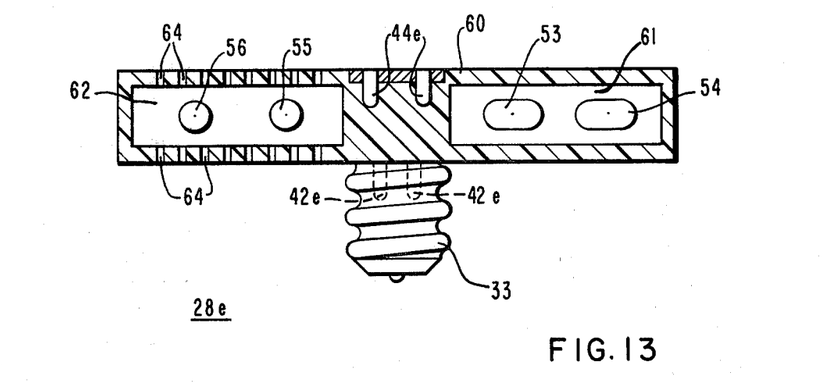
FIG. 13 is a cross-sectional view of the solid-state circuit module, along line XIII—XIII of FIG. 12.

In view of the miniature size of the solid-state circuit components, they could be housed in a very compact module 28e of the type shown in FIG. 12 having a rectangular casing 60 of suitable high-temperature plastic or the like. As in the previous embodiments, a set of four slip-fitting contact elements 44e would be provided in the top face of the module to receive the lamp pins, and a set of prongs or pins would be provided on the bottom face of the module. Such pins 42e are shown in phantom in FIG. 13 and permit the module 28e to be plugged into the adapter 33. As further shown in FIG. 13, the rectangular module member 60 is divided into two separate compartments 61 and 62 which contain the various solid-state circuit components, the resistors 55 and 56 being housed in compartment 62 (as illustrated) to avoid overheating the capacitors 53, 54 and the other components which are located in the other compartment 61. If necessary, suitable vent openings 64 are provided in the module casing 60 to convection-cool compartment 62 and the resistors during lamp operation. While the length of module 28e would still be greater than the width of the opening defined by the harp component of the lighting fixture, the width of the module would be small enough to provide sufficient clearance for insertion into the harp component so that no narrowing or constriction of the medial portion of the module would be necessary. This would also be true with regard to the thickness dimension of module 28e.

While the plug-in coupling of the various components in each of the embodiments has been achieved by providing pin contacts on the fluorescent lamp and underside of the ballast module, it will be appreciated by those skilled in the art that the required plug-in connections could also be achieved by providing such pin terminals on the threaded adapter and on the top face of the module which would be accommodated by suitable sleeve-like contacts on the lamp and on the bottom face of the module. In addition, it is also within the scope of the invention to effect the mechanical and electrical mating of the discharge lamp, ballast module and adapter by providing the components with bayonet-type coupling means which would the achieve required electrical connections to be made by a "twist-lock" action. This would be satisfactory since it would permit the lamp-ballast unit to be slipped into the harp component and then be interlocked with the adapter plug without rotating the unit to seat it in the screw socket of the lighting fixture.

If temporary removal of the harp component of the lamp fixture to permit the lamp-ballast unit to be placed into the screw socket is acceptable from a consumer-use standpoint, then the threaded adapter plug can be made an integral part of the ballast module to provide a screw-in type lamp-ballast unit (with the adapter plug comprising a threaded base portion of the module). Of course, the elongated module of the screw-in unit would still have to be properly oriented relative to the fixture socket to permit the harp component to be placed over the lamp-module unit and be reattached to the base-support structure of the lighting fixture.

An alternative lamp-module unit 35f which employs a convoluted fluorescent lamp component 24f and modified module-adapter connectors is shown in FIG. 14. As will be noted, the lamp component 24f has a triple-U-bent envelope 26f made of glass tubing the sealed ends whereof are secured to a base member 66 which carries the four terminal pins 41f. One of the U-bent segments of the envelope 26f has a nipple-like tubulation 68 which provides a "cool" region within the lamp for condensed mercury and thus serves as a means for controlling the mercury vapor pressure during lamp operation.

In contrast to the previous embodiments, the ballast module 28f has a pair of blade-like contacts 42f which extend from the bottom face of the medial segment 32f and are oriented to plug into and engage a pair of slot-like contactor elements 43f in the adapter member 33f. The adapter 33f can thus be a conventional type threaded plug which is commonly used and readily available. This arrangement has an additional advantage in that it automatically prevents the 4-pin fluorescent lamp component 24f from being inserted into the dual-slotted adapter plug 33f and thus accidently operated without any ballast means.

As will be noted in FIG. 14, due to the fact that the base 66 and terminal pins 41f of the triple-U-bent lamp 24f are offset from the axis of the lamp the plug-in contacts (not shown) of the ballast module 28f are similarly offset and located in the top face of segment 31f. This will ensure that the lamp component 24f and ballast module 28f are symmetrically aligned with one another when they are in plugged-in relationship—that is, with the medial U-bent segment of the lamp located above segment 30f of the module as illustrated.

I claim:

1. As a new article of manufacture adapted for use as a detachable ballast means for a compact electric discharge lamp, an elongated module having a medial segment and a pair of laterally-extending offset segments each of which contains electrical components that comprise parts of the ballast circuit,
   the thickness and width dimensions of said module being less than the length dimension thereof and said medial segment having plug-in type contact means that is connected to said electrical components and engageable in a direction transverse to the longitudinal axis of the module.

2. The ballast module of claim 1 wherein said plug-in type contact means comprise a plurality of slipfit contactors that are recessed within the medial segment of the module and are substantially centered with respect to the transverse axis of the module.

3. The ballast module of claim 1 wherein;
   the plug-in type contact means are located on one face of the module, and
   a second plug-in contact means is disposed on an opposite face of the module and connected to said electrical components.

4. A compact lamp-ballast unit adapted for placement and use in a lighting fixture such as a table lamp or the like that has socket means located within a harp component which is arranged to support a lamp shade and defines an opening of predetermined size and shape, said lamp-ballast unit comprising the combination of;
   an elongated electric discharge lamp of single-ended construction having terminal means at one end adapted for plug-in type electrical connection, the overall height and width dimensions of said lamp being less than the corresponding dimensions of the opening defined by said harp component, and
   a ballast module of laterally elongated configuration seated in abutting relationship with the terminal end of the discharge lamp and having a pair of offset segments that are joined by a medial segment which includes a first contact means that is in force-fitted plug-in engagement with the terminal means of the discharge lamp and releasably couples the ballast module and lamp in mated operative relation,
   said ballast module being of such length along its laterally elongated dimension that the offset segments extend beyond the sides of the discharge lamp and said module thus exceeds the width dimension of the opening defined by the harp component of the lighting fixture,
   the medial segment of said ballast module having a second contact means that is located on a part of the module remote from the first contact means and is adapted to engage and electrically connect with the socket means of the lighting fixture,
   the configuration of the ballast module and the width of the medial segment thereof being such that the lamp-ballast unit has overall height and width dimensions which permit the unit to fit within the opening of the harp component when the unit is properly oriented with respect to the lighting fixture and is seated in the socket means thereof.

5. The compact lamp-ballast unit of claim 4 wherein the second contact means are disposed on the face of the medial segment of the ballast module which is opposite the coupled discharge lamp so that the first and second contact means are located on opposite faces of said medial segment.

6. The compact lamp-ballast unit of claim 5 wherein;
   the socket means of the lighting fixture comprises a screw-in type socket that is located at the bottom of the opening defined by the harp component, and
   said second contact means of the ballast module comprises a threaded adapter member.

7. The compact lamp-ballast unit of claim 6 wherein the threaded adapter member comprises an integral fixed part of the ballast module and thus constitutes a threaded base member therefor.

8. The compact lamp-ballast unit of claim 6 wherein the threaded adapter member comprises a detachable part of the ballast module and is electrically coupled thereto by mating plug-in elements that are carried by the module and adapter member.

9. The compact lamp-ballast unit of claim 4 wherein; said lamp is of the low-pressure electric discharge type, and the ballast module contains two iron-core inductive type ballast components that are disposed in the respective offset segments of the module.

10. The compact lamp-ballast unit of claim 9 wherein the module includes switch means operable to connect the discharge lamp to only one of the ballast components or to both of the ballast components so that the lamp can be operated at two different lighting levels.

11. The compact lamp-ballast unit of claim 4 wherein;
said lamp is of the low-pressure electric discharge type, and
the ballast module contains a solid-state type ballast means.

12. The compact lamp-ballast unit of claim 11 wherein;
the solid-state ballast means includes a ballast resistor and a circuit that converts an alternating-current input to direct-current output, and
the offset segments of the ballast module define two chambers, one of which contains the ballast resistor.

13. The compact lamp-ballast unit of claim 12 wherein the ballast resistor is located within a compartment defined by the module and said compartment is convection-cooled by vent openings in the module.

14. The compact lamp-ballast unit of claim 4 wherein said electric discharge lamp comprises a fluorescent lamp that has an envelope which is internally partitioned or of tubular form and bent to define a tortuous arc path.

15. The compact fluorescent lamp-ballast unit of claim 14 wherein said fluorescent lamp has a tubular envelope that is of convoluted configuration and includes a plurality of conjoined U-bent segments.

16. The compact fluorescent lamp-ballast unit of claim 15 wherein the fluorescent lamp envelope is of triple-U-bent configuration.

17. The compact fluorescent lamp-ballast unit of claim 14 or 15 wherein;
the lamp terminal means comprises a plurality of contact pins that protrude from the end of the lamp, and
the first contact means on the medial segment of the ballast module comprises sleeve-like contactors that are oriented and dimensioned to mate with the contact pins of the lamp in plug-in fashion.

18. The compact fluorescent lamp-ballast unit of claim 17 wherein the second contact means on the medial segment of the ballast module comprises a plurality of plug-in contactors which protrude from the face of the medial segment that is opposite the plugged-in fluorescent lamp.

19. The compact fluorescent lamp-ballast unit of claim 17 wherein the thickness dimension of the medial segment of the ballast module is less than that of the two offset segments and provides a recess for the socket means of the lighting fixture and thereby reduces the overall height dimension of the lamp-ballast unit along the axis thereof.

20. The compact fluorescent lamp-ballast unit of claim 17 wherein the width dimension of the medial segment of the ballast module is less than that of the two offset segments.

* * * * *